US009495550B2

(12) United States Patent
Anderson et al.

(10) Patent No.: US 9,495,550 B2
(45) Date of Patent: Nov. 15, 2016

(54) SYSTEM AND METHOD FOR SHARING OF DATA SECURELY BETWEEN ELECTRONIC DEVICES

(75) Inventors: J. Chance Anderson, West Jordan, UT (US); Aaron Michael Best, Murray, UT (US); David J. Havell, Salt Lake City, UT (US); J. Ken Barton, Sandy, UT (US); Jandi Renee Carter, West Jordan, UT (US)

(73) Assignee: J. Chance Anderson, West Jordan, UT (US)

(*) Notice: Subject to any disclaimer, the term of this patent is extended or adjusted under 35 U.S.C. 154(b) by 58 days.

(21) Appl. No.: 13/479,254

(22) Filed: May 23, 2012

(65) Prior Publication Data

US 2013/0036480 A1 Feb. 7, 2013

Related U.S. Application Data

(60) Provisional application No. 61/515,252, filed on Aug. 4, 2011.

(51) Int. Cl.
| | |
|---|---|
| *G06F 7/00* | (2006.01) |
| *G06F 21/62* | (2013.01) |
| *G06F 21/32* | (2013.01) |
| *G06F 21/34* | (2013.01) |
| *G06F 21/77* | (2013.01) |
| *H04L 29/06* | (2006.01) |

(52) U.S. Cl.
CPC ........... *G06F 21/6218* (2013.01); *G06F 21/32* (2013.01); *G06F 21/34* (2013.01); *G06F 21/77* (2013.01); *H04L 63/0853* (2013.01); *H04L 63/0861* (2013.01); *G06F 2221/2153* (2013.01)

(58) Field of Classification Search
CPC ........................................................ G06F 21/32
USPC ................ 726/2, 6, 30, 9; 713/186; 380/44; 382/124
See application file for complete search history.

(56) References Cited

U.S. PATENT DOCUMENTS

| | | | |
|---|---|---|---|
| 7,065,195 B1* | 6/2006 | Smith et al. | 379/144.01 |
| 7,212,613 B2* | 5/2007 | Kim et al. | 379/88.02 |
| 8,392,965 B2* | 3/2013 | Carter et al. | 726/2 |
| 2006/0163344 A1* | 7/2006 | Nwosu | 235/380 |
| 2009/0064302 A1* | 3/2009 | Colella | 726/9 |
| 2009/0191846 A1* | 7/2009 | Shi | 455/411 |
| 2010/0156596 A1* | 6/2010 | Herder | 340/5.82 |
| 2011/0102141 A1* | 5/2011 | Wu | 340/5.82 |
| 2011/0137803 A1* | 6/2011 | Willins | 705/67 |
| 2011/0140841 A1* | 6/2011 | Bona et al. | 340/5.83 |
| 2011/0175702 A1* | 7/2011 | Desnoyers | 340/5.82 |
| 2011/0211690 A1* | 9/2011 | Tu et al. | 380/44 |
| 2011/0240748 A1* | 10/2011 | Doughty et al. | 235/492 |
| 2011/0314526 A1* | 12/2011 | Valentine et al. | 726/6 |
| 2012/0166810 A1* | 6/2012 | Tao et al. | 713/186 |
| 2012/0286930 A1* | 11/2012 | Kim | 340/5.82 |
| 2012/0318863 A1* | 12/2012 | Kim | 235/380 |
| 2012/0321148 A1* | 12/2012 | Kim | 382/124 |

\* cited by examiner

*Primary Examiner* — Beemnet Dada
*Assistant Examiner* — Sayed Beheshti Shirazi
(74) *Attorney, Agent, or Firm* — Clayton, Howarth & Cannon, P.C.

(57) ABSTRACT

A system for securely sharing data and conducting transactions in an electronic environment. The system may include a personal information device having a processor, memory and biometric sensor. Personal data is stored in the memory of the personal information device. The personal information device may be registered with a centralized system. Data stored on the personal information device may be uploaded to an access device upon verification of a user's identity using a biometric recognition technique.

14 Claims, 5 Drawing Sheets

SYSTEM AND METHOD FOR SHARING OF DATA SECURELY BETWEEN ELECTRONIC DEVICES

CROSS-REFERENCE TO RELATED APPLICATIONS

This application claims the benefit of U.S. Provisional Application No. 61/515,252, filed Aug. 4, 2011, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Present Disclosure

The present disclosure relates generally to electronic communications, and more particularly, but not necessarily entirely, to electronic devices for personal and business use in a wide variety of secure transactions and information exchanges.

2. Description of Related Art

Identify theft and fraud is a growing problem. Identity theft and fraud occur when someone maliciously uses someone else's personal identifying information, including name, Social Security, or credit card number, without permission to commit fraud or other crimes. Crimes take many forms as identity thieves may rent an apartment, obtain a credit card, or establish an account in someone else's name. The victim may not find out about the theft until it is too late. Victims of identity theft may spend countless hours and dollars attempting to rectify the crimes. Companies such as banks and credit card companies spend billions because of it.

One way to prevent identity theft is through the use of biometrics. Biometrics utilize methods that uniquely recognize humans based upon one or more intrinsic physical or behavioral traits. Biometrics can be used for both verification and identification. Verification involves a one to one comparison of captured biometric data with stored biometric data, sometime referred to herein as a biometric template, to verify the identity of an individual.

Although it is recognized in theory that biometrics may reduce instances of identity theft and aid in verification of an individual, adequate implementation of biometric technology has not been forthcoming in the marketplace. Despite the advantages of known biometric systems, improvements are therefore still being sought.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
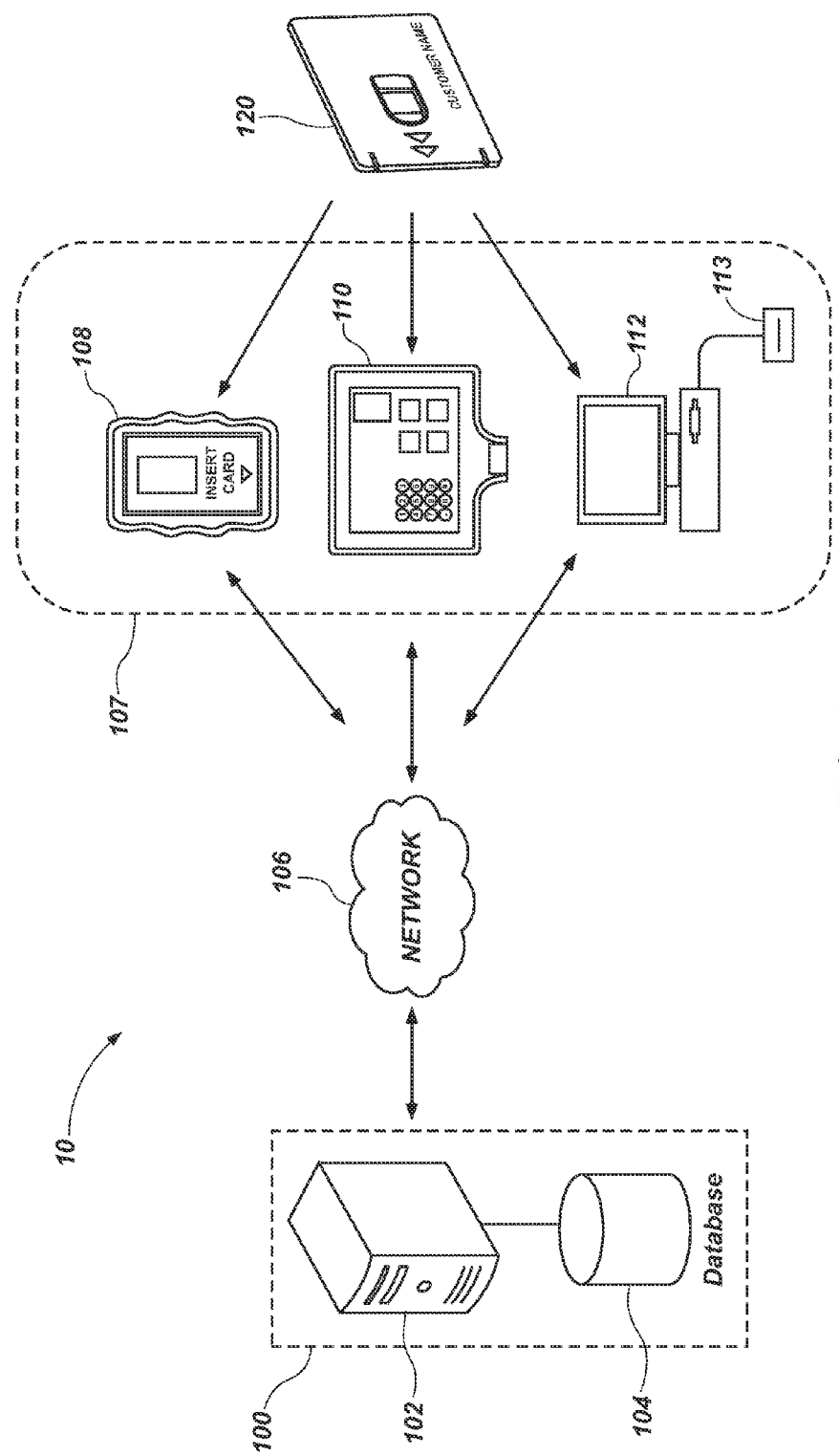
FIG. 1 is a block diagram of an electronic environment for conducting secure data exchanges between electronic devices according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

In an embodiment of the present disclosure, a personal information device is provided that allows a user to conduct secure transactions using personal and private information. In an embodiment of the present disclosure, the personal information device may be available from retailers. At the time of purchase, the personal information device may be activated by the retailer. The user of the personal information device may then register the device and provide personal information with a centralized system.

In an embodiment, the personal information entered by the user will be logically associated with the personal information device purchased by that user in a database of the centralized system. The personal information may include social security number, driver's license number, birth date, passport information, financial information, bank account information or any other information desired to be associated with the personal information device by the user.

In an embodiment, each personal information device may have a unique identification code. The identification code may allow the user of the device to access the personal information associated with the device. But, without the identification code, the personal information in the database may not be accessible.

In an embodiment, a user may purchase or otherwise obtain a personal information device. The user may then register the personal information device with a centralized system. At the time of registration, the user may provide personal information, such as a social security number. The centralized system may first cross check the social security number to ensure that it has not been utilized with any other devices. If the social security number has not been utilized with another device, then the centralized system will allow the social security number of the user to be associated with the unique I.D. of the device. The information associated with the device by the centralized system may only be accessed using the correct device. Once a user has registered a device and provided personalized information to the centralized system, the personalized information may be uploaded and stored in a memory of the device.

At the time of registration of the personal information device, a user may provide a biometric sample. In an embodiment, the biometric sample may comprise a fingerprint, a voice sample, an iris image capture. In addition, a user may also provide a pin number.

In an embodiment, the personal information device may be utilized to make purchases from retail locations. In particular, retailers may utilize an access device. The access device may include software and hardware that will allow the access device to communicate with the centralized system. The access device may read the unique identification number of the device. The access device may be in electronic communication with the centralized system. The access device may have a display that will allow the user to select a payment method. For example, the personal information device may have several different credit card numbers stored therein. Thus, a user may be prompted to select one of the credit card numbers in order to make a payment. In an embodiment, a user may be able to split payment among several credit cards.

In an embodiment, the personal information device may have a biometric sensor for obtaining a biometric sample from the user. Alternatively, the access device may incorporate a biometric sensor. The biometric sensor may be utilized to confirm that the user is the registered owner of the device.

It will be appreciated that an advantage of the present disclosure is that a user can register all of his or her personal information with the centralized system. Using the personal information device, the user may be able to provide or access the personal information due to the use of the biometric identification, which verifies the identity of the user of the device.

In an embodiment, the access device may transmit the unique identification number of the personal information device to the centralized system for verification purposes. The centralized system may then determine whether or not the personal information device has been compromised or is otherwise invalid. For example, if an unauthorized user attempts to utilize the personal information device, the centralized system may provide an alert message to the access device which will block any subsequent transactions. The communications between the access device and the centralized system may be encrypted.

In an embodiment of the present disclosure, the personal information device may take a wide variety of form factors and may have additional functionality. In an embodiment, the personal information device may be a card, slightly larger than a credit card. In an embodiment, the personal information device may be a cellular telephone. In an embodiment, the personal information device may take the form of a handheld computing device.

In an embodiment of the present disclosure, the personal information device may include a microprocessor and a memory. Stored in the memory may be computer instructions. The personal information device may further include a biometric sensor. The personal information device may further include a memory that stores personal information regarding the user. The personal information device may further include an interface for communicating with other electronic devices. In an embodiment, the personal information device may further include a battery. In an embodiment, the personal electronic device may further comprise a display. It will be appreciated that the personal electronic device may be fabricated to include structures to provide wireless functionality and also include structures to include contactless functionality.

Referring now to FIG. 1, there is depicted a system 10 according to an embodiment of the present disclosure. The system 10 may comprise a centralized system 100. The centralized system 100 may comprise a server 102 and a database 104. It will be appreciated that the server 102 may comprise a plurality of servers located a different geographic locations that operate as a single enterprise. The database 104 may reside on a mass storage medium, such as a hard drive as is known to one having ordinary skill in the art.

The centralized system 100 may by connected to a network 106. The network 106 may comprise the Internet, or any other network that allows electronic communication between two different devices. The network 106 may comprise a local area network or a wide area network.

The system 10 may further include one or more access devices 107 that are able to communicate with the centralized system 100 over the network 106. It will be appreciated that the access devices 107 may be owned and operated by a third-party, such as a retail store, bank or a law enforcement agency. The access devices 107 may include a handheld verification device 108, a kiosk verification device 110, and a computer 112. Each of the handheld verification device 108, the kiosk verification device 110, and the computer 112 may be able to communicate over the network 106 with the centralized system 100. Each of the handheld verification device 108, the kiosk verification device 110, and the computer 112 may be able to access data on a personal information device 120.

As mentioned, the system 10 may further include the personal information device 120. The personal information device 120 may be carried by a user. In an embodiment of the present disclosure, the personal information device 120 may be just slightly larger than a traditional credit card with dimensions of approximately 0.125 inches thick by 2.125 inches wide by 3.375 inches long. The dimensions of the personal information device 120 may vary as technology permits.

Each of the handheld verification device 108, the kiosk verification device 110, and the computer 112 may include an interface to communicate with the personal information device 120. In an embodiment of the present disclosure, each of the handheld verification device 108, the kiosk verification device 110, and the computer 112 may include a slot for receiving the personal information device 120. The slot may include an input/output port for forming an electrical communication connection with the personal information device 120 such that data can be exchanged.

In an embodiment, the each of the handheld verification device 108, the kiosk verification device 110, and the computer 112 may include a microprocessor and a memory. Operating instructions, e.g., software or firmware, stored in the memory are executed by the processor. The operating instructions may be such to allow the each of the handheld verification device 108, the kiosk verification device 110, and the computer 112 to perform the features described herein.

Figure 2:
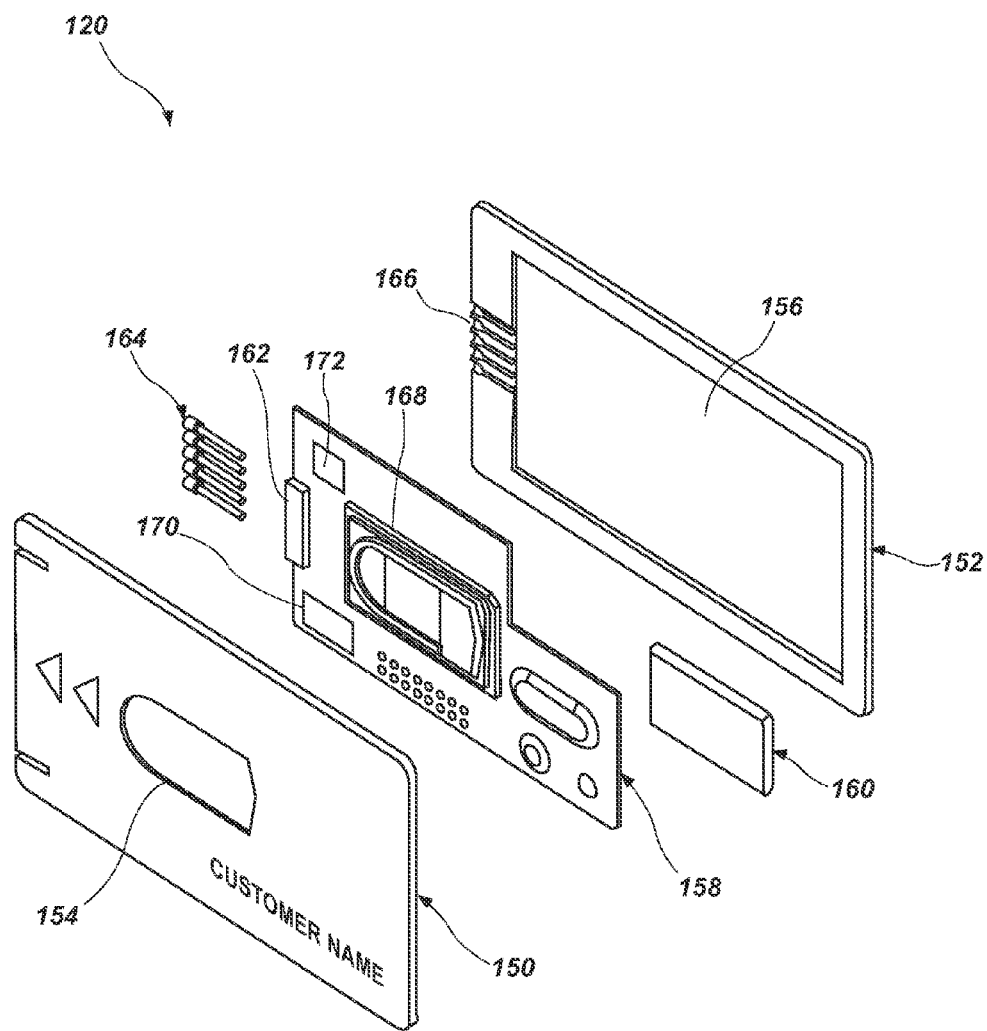
FIG. 2 is an exploded view of a personal information device according to an embodiment of the present disclosure.

Referring now to FIG. 2, there is depicted an exploded view of the personal information device 120 according to an embodiment of the present disclosure. The device 120 may comprise a housing having a front housing member 150 and a back housing member 152. The front housing member 150 and the back housing member 152 may be substantially rectangular in shape. The front housing member 150 may include a cutout 154. The back housing member 152 may include a recessed portion 156.

The personal information device 120 may further comprise a circuit board 158 powered by a battery 160. It will be appreciated that power sources other than battery 160 may be included within the scope of the present invention, as well as other devices described herein which need a power source, as can be best determined by one having skill in the art. The circuit board 158 may comprise a connector 162 for receiving a plurality of pins 164. Additionally, the back housing member 152 may include slots 166 for accommodating the pins 164. Mounted on the circuit board 158 may be biometric sensor 168. The shape of the sensor 168 may allow it to fit through the cutout 154 such that the sensor 168 is accessible to a user. In an embodiment, the sensor 168 may be a fingerprint scanner.

The personal information device 120 may further comprise a microprocessor 170 and a memory 172 mounted on the board 158. In an embodiment of the present disclosure, the memory 172 and the microprocessor 170 may be discrete components or they may be integrated into a single chip. The microprocessor 170 may be in communication with the sensor 168.

Figure 3:
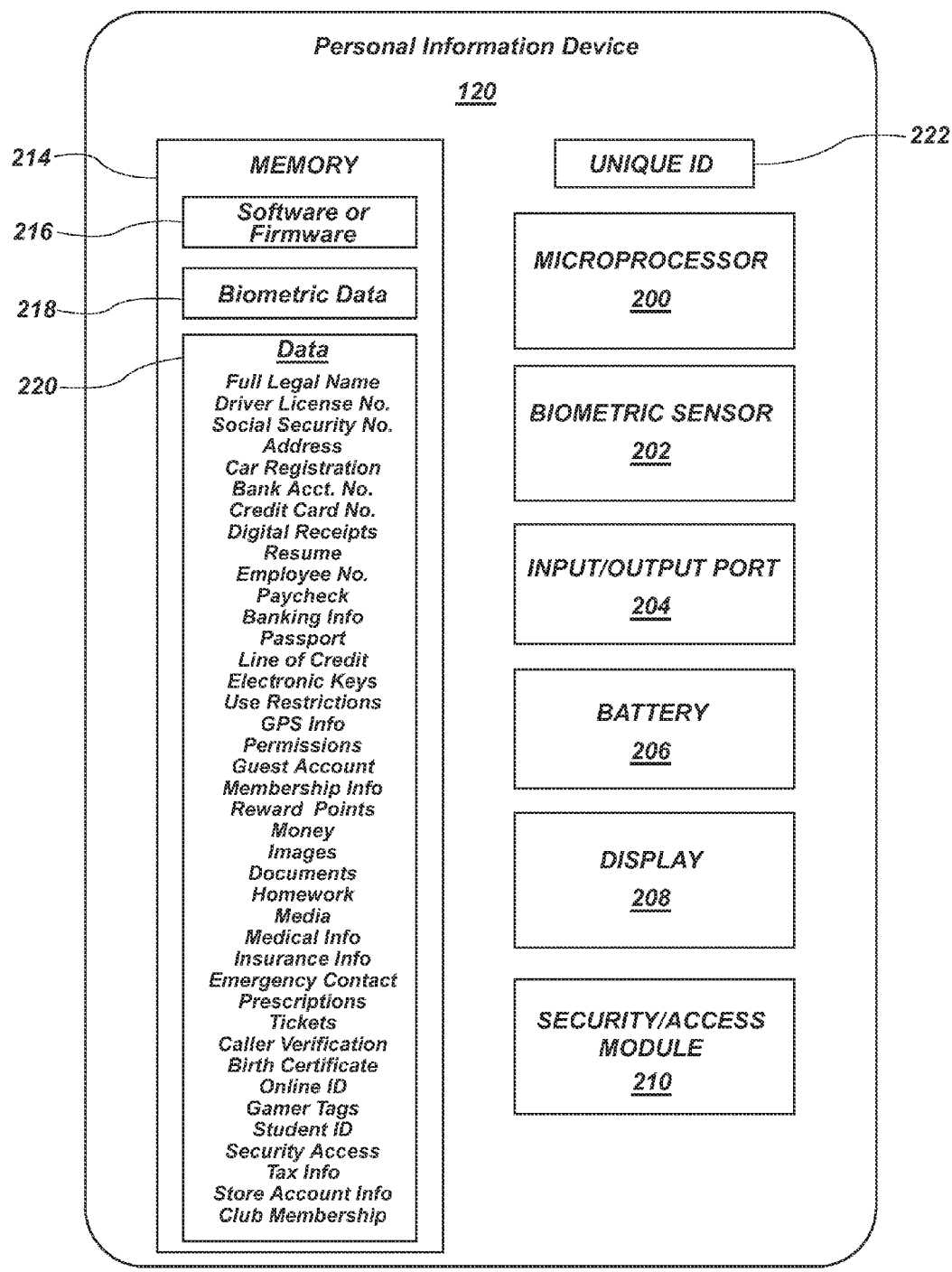
FIG. 3 is a block diagram of a personal information device according to an embodiment of the present disclosure.

Referring now to FIG. 3, there is depicted a block diagram of the personal information device 120 pursuant to an embodiment of the present disclosure. The personal information device 120 may include a microprocessor 200 to enable the personal information device to perform the features described herein. The processor 200 may be programmed with firmware as is known to one having ordinary skill in the art.

The processor 200 may be connected to a memory 214. The memory 214 may include non-volatile memory such that information stored in the memory 214 may be retained without power. The information stored in the memory 214 may be secured by an encryption scheme as is known in the art. Any suitable encryption methodology with adequate protection may be utilized to protect the data stored in the memory 214. The memory 214 may have software or firmware stored therein for execution by the microprocessor 200.

The personal information device 120 may further include a biometric sensor 202 for capturing a user's biometric data. In an embodiment of the present disclosure, the biometric sensor 202 may comprise a fingerprint scanner. In an embodiment of the present disclosure, the biometric sensor 202 may include a microphone for capturing a sample of a user's voice. In an embodiment of the present disclosure, the biometric sensor 202 may include a camera for capturing an image, such as an iris scan or eye scan.

The personal information device 120 may further include an input/output port 204 for receiving and transmitting data with other electronic devices. In addition, the personal information device 120 may receive power through the input/output port 204, if needed, to charge a battery 206. In an embodiment of the present disclosure, the personal information device 120 may include the battery 206. In an embodiment of the present disclosure, the battery 206 may be a re-chargeable battery.

In an embodiment, the personal information device 120 may further include a display 208. In an embodiment of the present disclosure, the display 208 may be as simple as indicator lights or an LED display or any other type of display. In an embodiment, the personal information device 120 may also include a wireless chipset and antenna (not shown) for receiving and sending data using wireless communications.

As shown in FIG. 3, the memory 214 of the personal information device 120 may store a wide variety of personal data 220 and software/firmware 216. As mentioned, the software/firmware 216 may be executable by the processor 200 to accomplish a wide variety of tasks, including encrypting the data, and facilitating information exchange with other devices. That is, the memory 214 may include software/firmware for operating the processor 200 of the personal information device 120 to accomplish the features and functionality described herein. The software/firmware 216 may further include encryption software for protecting the data stored in the memory 214.

The memory 214 may include biometric data 218 submitted by a user during an enrollment process. In an embodiment of the present disclosure, the biometric data 218 may include a biometric template, such as a fingerprint sample, a voice sample, or a image sample for the user. The biometric data 218 may include data derived from a biometric sample. The biometric data 218 may be utilized to verify the identity of a user through biometric recognition techniques.

The following Table 1 lists personal data 220 that may be stored in the memory 214. It will be appreciated that the personal data 220 listed in Table 1 is by no means intended to be comprehensive but is a sample of the data that may be stored on the personal information device 120.

TABLE 1

| Data |
| --- |
| Full Legal Name |
| Driver License Info. |
| Social Security No. |
| Contact Info. (email, home address, work address, cell phone number, work number, home number, etc.) |
| Car Registration Info. |
| Bank Account Info. |
| Credit Card No. |
| Digital Receipts of Purchases |
| Resume/Job Application Info. |
| Employment Info. |
| Paycheck Info. |
| Banking Info. |
| Passport |
| Line of Credit |
| Electronic Keys |
| Use Restrictions |
| GPS Info. |
| Passwords |
| Guest Account |
| Membership Info. |
| Reward Points |
| Money |
| Images |

TABLE 1-continued

Data

Documents
Homework
Media (music, ebooks, movies, etc.)
Medical Info.
Insurance Info.
Emergency Contact
Prescriptions
Tickets
Caller Verification
Birth Certificate
Online ID
Gamer Tags
Student ID
Security Access
Tax Info.
Store Account Info.
Club Membership Info.

The personal information device 120 may further include a security access module 210. The security access module 210 may be operable to prevent access to the data stored in the memory 214 without proper user verification. That is, only the user's whose biometric features match the biometric template 218 stored on in the memory 214 may be granted access to the data 220.

In an embodiment of the present disclosure, the security access module 210 may allow selective access to the data 220 stored in the memory 214. For example, the security access module 210 may only allow access to the name and address information stored in the memory 214. Thus, access to the data stored in the memory 214 is authorized via the security access module 210. The security access module 210 may comprise software executable by the microprocessor 200.

In an embodiment of the present disclosure, such data access is only permitted by the security access module 210 only if the user provides the proper biometric authentication through the biometric sensor 202. For example, a biometric capture made through the biometric sensor 202 may be compared to the biometric data 218 stored in the memory 214 or at the centralized system 100. If the biometric capture matches the biometric data 218, then the identity of the user is considered verified and access to the data 220 in the memory 214 may be granted.

The security access module 210 may also include the ability to erase all of the data 220 in the memory 214 in the event that the personal information device 120 is stolen. For example, if an unauthorized use occurs, the personal information device 120 may be instructed by a centralized system to permanently erase all of the data 220. The personal information device 120 may have an associated unique ID 222. The unique ID 222 may be provided to other electronic devices upon request.

Figure 4:
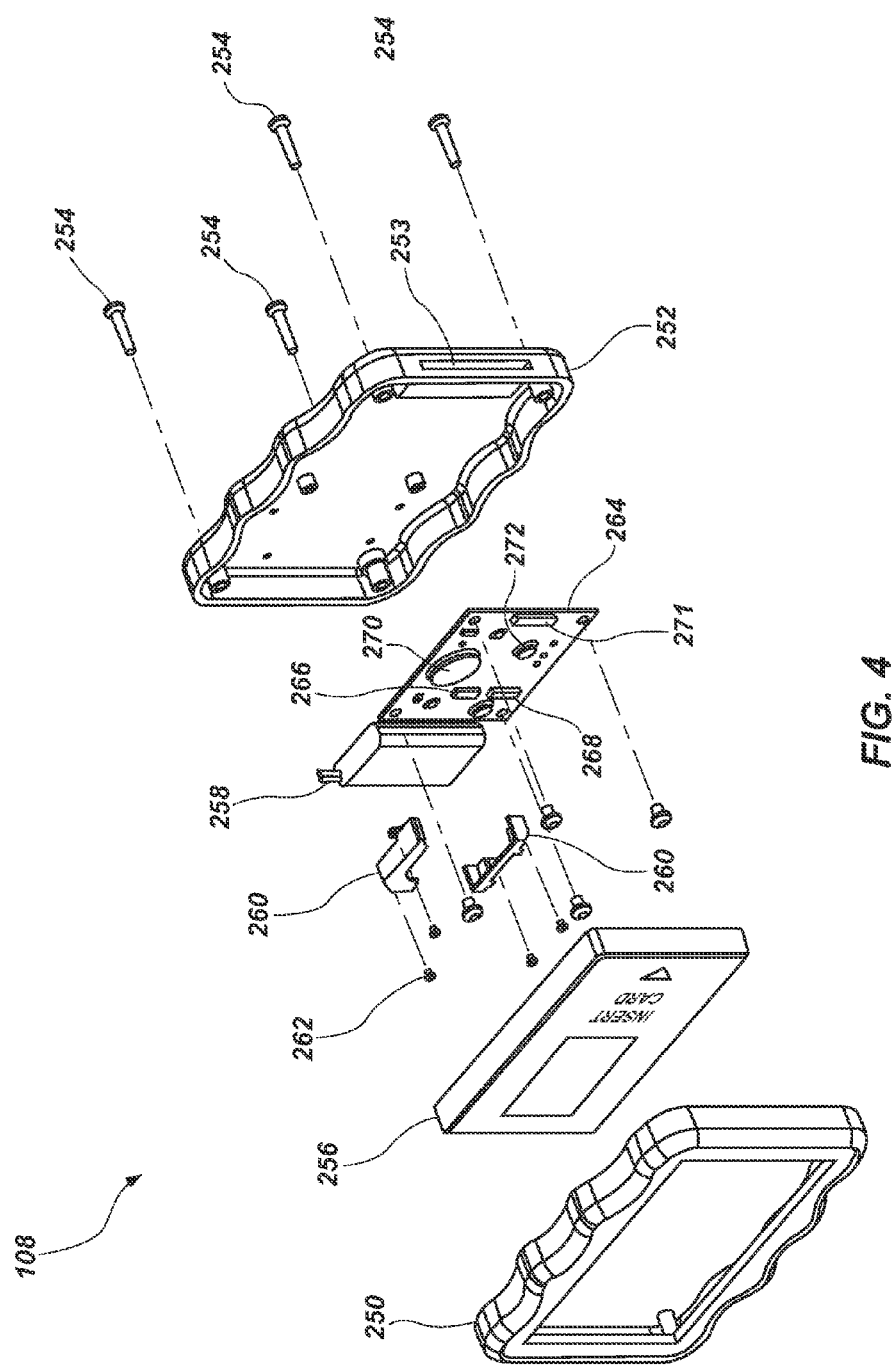
FIG. 4 is an exploded view if an access device system according to an embodiment of the present disclosure.

Referring now to FIG. 4, there is depicted an exploded view of the handheld verification device 108. The device 108 may include a front housing member 250 and a back housing member 252. The front housing member 250 and the rear housing member 252 may be secured together using a plurality of fasteners 254. The back housing member 252 may include a slot 253 for receiving the personal information device 120.

The handheld verification device 108 may include a display 256, such as an LCD screen with touch capability. The handheld verification device 108 may further include a battery 258 held in place by brackets 260 and fasteners 262.

The handheld verification device 108 may further include a printed circuit board 264. The printed circuit board 264 may include a microprocessor 266, a memory 268, a driver 270 for the display 256, and a input/output port 271 for communicating with the personal information device 120. The printed circuit board 264 may further include a wireless communication module and antenna 272 for communication with the centralized system 100 over the network 106. The handheld verification device 108, as well as similarly functioning devices within the scope of the present invention, as well as the centralized system 100, as well as similarly functioning devices within the scope of the present invention, will each have its own identification to increase security of the system, particularly in the case of theft. Moreover, such devices and systems can include biometric reachers and can include structures to facilitate wireless and/or contactless operation, as will be appreciated by those skilled in the art.

It will be appreciated that the handheld verification device 108 is a mobile hardware module that the personal information device 120 may be inserted into. Data in the memory 214 of the personal information device 120 may be uploaded to the device 108 after a bio-authorization method. The handheld verification device 108 is mainly used for portable on-person transactions. For example, the handheld verification device 108 may be utilized by police and emergency services to read data on the personal information device 120, including driver's license information, insurance information, medical information, car registration and insurance information, etc. The handheld verification device 108 may include an emergency override to access the information on the personal information device 120 in the event that a user is incapacitated.

The handheld verification device 108 may be carried by others, such as restaurant servers and other businesses that need a mobile point of sale. For example, in this situation, payment information from the personal information device 120 could be uploaded to the handheld verification device 108. The handheld verification device 108 may include a touch sensitive screen for capturing signatures, add additional amounts for tips, and be able to generate a virtual receipt. The touch screen may also allow a user to choose a type of payment. The handheld verification device 108 may include structures to provide wireless communication with the centralized system 100 as well as to other devices to provide additional functions.

Figure 5:
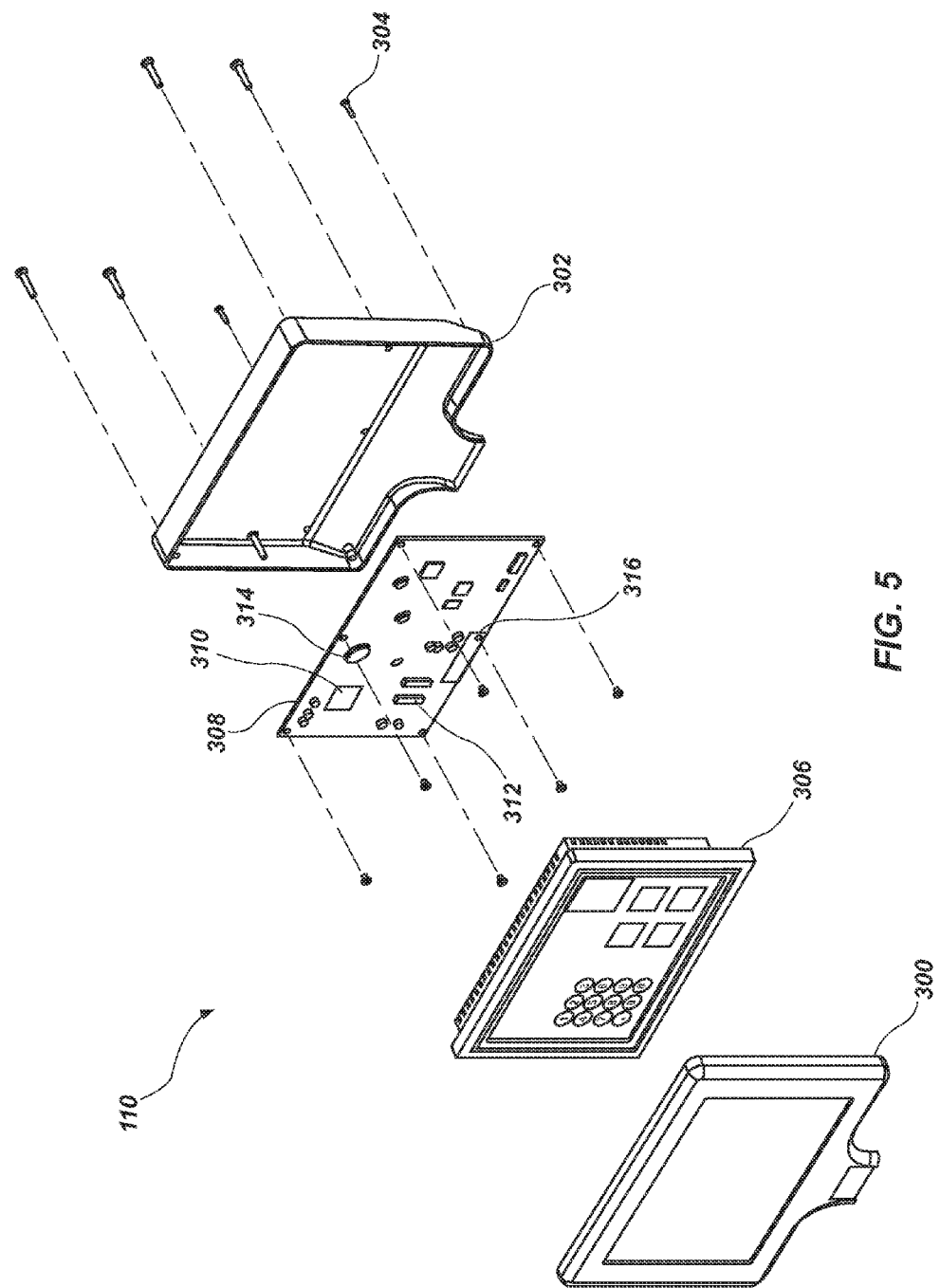
FIG. 5 is an exploded view if an access device system according to an embodiment of the present disclosure.

Referring now to FIG. 5, there is depicted an exploded view of the kiosk verification device 110. The device 110 may include a front housing member 300 and a back housing member 302. The front housing member 300 and the rear housing member 302 may be secured together using a plurality of fasteners 304. The kiosk verification device 110 may include a stand (not shown) so that the device 110 can be placed on a flat surface, such as near a point of sale, in a semi-upright position.

The kiosk verification device 110 may include a display 306, such as an LCD display with touch capability. The kiosk verification device 110 may further include a printed circuit board 308. The printed circuit board 308 may include a microprocessor 310, a memory 312, a display driver 314, and a input/output port 316 for communicating with the personal information device 120. The kiosk verification device 110 may be connected by a power cord (not shown) to a wall outlet. In addition, the kiosk verification device 110 may be connected to the centralized system 100 over the network 106. It will be appreciated that the kiosk verification device 110 may take a wide variety of forms. For example, the kiosk verification device 110 may be incorporated into an ATM.

The kiosk verification device 110 may be a fixed hardware module that the personal information device 120 may be connected to such that data may be exchanged. The sanctioned user may authorize a data transfer to proceed using a biometric recognition technique. The kiosk verification device 110 may be mainly used for point-of-sale transactions. The kiosk verification device 110 would be used for store sales. The kiosk verification device 110 may be able to upload payment information, such as credit card, debit card, or electronic check information in the memory 214 of the personal information device 120. The kiosk verification device 110 may include an area able to capture signatures or add additional amounts such as tips. The kiosk verification device 110 may also print receipts. The kiosk verification device 110 may also download electronic receipts to the personal information device 120, which are then stored in the memory 214 of the personal information device 120 and printed out later or uploaded to another storage device.

Referring back to FIG. 1, the computer 112 may take a wide variety of forms, including a desktop computer, a laptop computer, or a handheld computer. The computer 112 may include a display, processor and a memory as is known to one having ordinary skill in the art. The computer 112 may also include user input devices, such as a keyboard and mouse such that a user can provide input. The computer 112 may have a network connection to the network 106 such that it can communicate with the centralized system 100. The computer 112 may have a reader 113 attached thereto for allowing the computer 112 to interface with the personal information device 120. The reader 113 may be attached to the computer 112 via a port, such as a USB port.

It will be appreciated that the access devices 107 may be able to communicate with the centralized system 100 over the network 106 using two-way communication. It will be further appreciated that the network 106 may comprise one or more networks.

User Enrollment

When a user first obtains a personal information device 120, the user will need to establish an account with the centralized system 100. This may be most easily accomplished using the computer 112, since it is best able to handle data entry, but any of the access devices 107 may be utilized. When an access device 107 first reads the personal information device 120, computer 112 may read the unique ID number 222 stored on the device 120 and transmit it to the centralized system 100. The system 100 will determine if this is the first time that the personal information device 120 has been utilized. If it is the first time, the centralized system 100 will prompt the access device 107 to initiate an enrollment procedure.

The enrollment procedure may involve prompting the user enter required data, including name, address, and contact information. In addition, the user may be prompted to enter other information, including any of the information in Table 1. The user may also be prompted to provide a biometric sample. For example, the user may provide a finger print scan. The data obtained from the user may be transmitted to the centralized system 100 and stored in the database 104. In addition, the data may be stored in a memory of the personal information device 120. The centralized system 100 may store a status of the personal information device 120 in the database 104. For example, the status may include information on the validity of the personal information device 120. The centralized system 100 may store the data entered by the user in association with a unique identification number assigned to the personal information device 120.

Information Access

The access devices 107 may be granted selective access to the data stored in a memory of the personal information device 120 depending on the needs of the access devices 107. In an embodiment of the present disclosure, access to the data may be dependent upon three factors.

First Factor: When the personal information device 120 is inserted into one of the access device 107, or otherwise identified, the personal information device 120 may immediately upload its unique identifier to the access device 107. The access device 107 may then transmit the unique identifier to the centralized system 100 over the network 106. The centralized system 100 may conduct a check using the unique identifier to ensure that the personal information device 120 is valid and authorized. For example, if the personal information device 120 has been reported stolen, then the centralized system 100 will send an alert to the access device 107 denying permission for use of the personal information device 120. The alert may also instruct the access device to delete any personal data in the memory of the personal information device 120. If, however, the personal information device 120 is determined to be valid and in good standing, and no other outstanding problems are found, then authorization to access the data stored in the memory of the personal information device 120 is granted to the access device 107 over the network 106. In an embodiment of the present disclosure, the centralized system 100 may grant permission to the access device 107 to only access pre-specified data stored on the personal information device 120. Desirably, the personal information device may include unique identifying information which can only be used with the particular device to increase the security of the device and the system.

Second Factor: Access to the data stored in the personal information device 120 by the access device 107 is dependent upon proper user identification. Once the personal information device 120 is inserted into the reader and verified valid with the centralized system 100, the access device 107 may be programmed to wait for user identification through biometric recognition. In an embodiment of the present disclosure, the user may provide a biometric sample through a biometric sensor integral to the personal information device 120. In an embodiment of the present disclosure, the user may provide a biometric sample using a biometric sensor associated with the access device 107.

Once a biometric sample has been obtained from the user, the biometric sample is compared to a known biometric template of the authorized user. In an embodiment of the present disclosure, the biometric template may be stored in a memory of the personal information device 120. In an embodiment of the present disclosure, the biometric data may be stored in a memory of the centralized system 100. (The biometric template may have been previously provided through an enrollment process).

Third Factor: The access devices 107 may be pre-configured to only be granted selective access to certain types of data stored in the memory of the personal information device 120. In an embodiment of the present disclosure, the hardware and/or software of each of the types of access devices 107 may be pre-programmed or configured to allow access to only a subset of the personal information on the personal information device 120. In an embodiment of the present disclosure, the personal information device 120 itself may restrict access to only a subset of the personal data in its memory based upon the type of access device 107. In this case, the personal information device 120 may be provided with an identifier by the access device 107 such that the personal information device 120 itself may determine which data the access device 107 is actually entitled to receive.

In an embodiment of the present disclosure, a user may manually select the personal data uploaded to the access device 107 from the memory 214 of the personal information device 120. For example, the user could manually select or authorize the data to be uploaded from its memory 214 using a touchscreen display of the access device 107. A pin or password could be utilized to ensure that it is the user that is selecting the data to be uploaded and not some other person.

It will be appreciated that each of the access devices 107 may include dedicated software to accomplish the needed tasks. For example, an access device 107 used by a law enforcement agency may be programmed to only allow the agency to access certain information in the memory of the personal information device 120. This information may include driver's license information, insurance information, vehicle registration and driving record or any other record. In another example, a restaurant's access device 107 may only permit the restaurant to access payment information, such as credit card information. The personal information device 120 may also be used for age verification.

A computer 112, on the other hand, may include software that allows a user to access and modify some of the information in the memory of the personal access device 120. Some information on the personal information device 120 may not be changed by a user, including government information.

Various examples illustrating the use of the present invention will now be described.

Example #1

Point of Sale Transaction

A store may have an access device 107 located at a point of sale. The access device 107 may have hardware and software that communicates with the personal information device 120. The access device 107 may upload payment information from the personal information device 120. The access device 107 may be pre-configured such that it will not allow any other information to be uploaded. For example, the access device 107 may not be allowed to access certain data, such as the user's social security number, driver's license, car registration or anything similar.

When the user inserts the personal information device 120, the access device 107 will recognize the personal information device 120 and will then prompt the user to verify that he is the owner of the personal information device 120. The user will then need to submit to a biometric sample. The access device 107 will then match the biometric sample to the biometric template. The personal information device 120 may then transmit the unique identification number of the device 120 to the centralized system 100 to verify that the device 120 is valid and authorized. The centralized system 100 will return a message indicating the status of the personal information device.

After verification, the access device 107 will then give the user the option to choose how to pay for the purchase. Depending upon the information stored on the personal information device 120, the user may choose to pay via debit card, credit card, or direct transfer. The access device 107 will let the user choose from whatever options the user has registered on the personal information device 120. After the user has chosen the desired method of payment, the access device 107 may once again ask the user to verify his identity. For example, the user may be prompted by the access device 107 to enter a numerical pin.

When the transaction is completed, the access device 107 will download a digital receipt onto the personal information device 120. If the user wants a paper receipt, he can print it off on any computer. If the user has need to return a purchased item, the user will just plug in the personal information device 120 and the software on the access device 107 will be able to find any and all receipts to that particular store. When the transaction is finished, the user simply removes the personal information device 120 from the reader of the access device 107. In an embodiment of the present disclosure, the personal information device 120 may be loaded with coupon information that may be uploaded to the access device 107.

Example #2

Financial Transaction

The personal information device 120 will have software and data that allows the user to pre-fill out a template, such as a loan application, and then all the user has to do to apply for a loan is just go stick the personal information device 120 into an access device 107. The access device 107 will have software that will pull all the information needed and be able to qualify the user for a loan or a line of credit. The personal information device 120 may have in memory verified information for the user, such as social security number, etc. All the card holder has to do is plug in the card into a access device 107 and the information may be uploaded when the user confirms his or her identity using a biometric sample.

Example #3

Job Application

The personal information device 120 will have software and data that the user can pre-fill out and then all the user has to do to apply for a job is just go stick the personal information device 120 into an access device 107. The access device 107 will have software that will pull all the information needed to apply for the job, such as educational information, previous job history and a photograph of the user once the user confirms his or her identity by providing a biometric sample.

Example #4

Time Keeping and Payroll

An employer may have its employees clock in and out with their personal information devices 120 and may have software that will automatic figure out payroll. Then when payday comes, the employees plug in their personal information devices into an access device 107. The access device 107 will then upload the paychecks to their devices 120. The employees then can take their devices 120 and plug it into a computer which will allow them to transfer the money from their paycheck to whatever account they want.

Example #5

Restaurant

When user goes to pay for food at a restaurant, the total will come up on an access device 107 and then give the option to tip and the user can type in whatever percentage for the tip once the user confirms his or her identity by providing a biometric sample. The access device 107 will then do the math for the user and give a total.

Example #6

Automatic Bill Pay

The user can set up automatic bill pay. The user plugs the personal information device 120 and the automatic bill pay will automatically be set-up from the information on the personal information device 120.

Example #7

Entering Information onto a Personal Information Device

The main software will be software that a user uploads onto a personal computer 112 that will give access to the personal information on a personal information device 120 and will allow the user to customize most of the information. When a user plugs in the personal information device 120 into the reader 113 of the computer 112, the computer 112 will prompt the user to verify his or her identity through biometrics. After the user has verified his or her identity, a main page will pull up that has all the user information on it. The information may include the data 220 shown in the memory 214 in FIG. 3. The computer 112 may also require that the user provide a typed password for additional security. Using the computer 112, the user is able to edit the information in the memory 214 of the personal information device 120. Using the computer 112, users may be able to report lost or stolen devices 120 to the centralized system 100.

Example #8

Electronic Key

A personal information device 120 will be able to replace any key and restrict access. For example, the personal information device 120 may replace a house key, door key, safe key, an office key, or a car key. An access device 107 may be programmed to allow entry to only for identified users. The access device 107 may be programmed to restrict access to certain individuals having devices 120 and limit access times. The access device 107 may also record date and time of access. This may also be used for automobiles to unlock and start. A personal information device 120 may be specified as a master to control, whereas other users' personal information devices 120 may have restricted privileges. A master device 120 may be utilized to grant others limited access.

So if a user's child is grounded, then the user can suspend the child's personal information device 120 so it does not work. The user can also place a curfew so that a car will not start after a certain time or even start once after the curfew and will only stay on for the time it will take to get home. A personal information device 120 may interface with a GPS unit that will track where home is and how long it should take to get home. The car will then shut off if it takes longer than it should to arrive home.

Also, the personal information device 120 may be set up so that if the user does not want the car to be used on certain days then the car will not work. It can also keep track of when the a personal information device 120 is used.

Example #9

Memberships

A personal information device 120 may also be used for various memberships, including gym memberships, club membership, etc. The personal information device 120 may replace membership cards that are traditionally provided by third-parties. The personal information device 120 may grant club access, track reward points, and will prohibit others from using the user's membership. If the user is enrolled in a rewards program, the personal information device 120 may track points and reward based upon purchases. The user may use a home computer to track information.

Example #10

Gifts

A personal information device 120 may also be used as a gift card. If a user wants to purchase a gift for another user, the user may go online to access the centralized system 100 and enter the other person's card number and bestow a gift. The other person may then redeem the gift by plugging his personal information device 120 into an appropriate access device 107. In other situations, a user may grant another user's device 120 a gift or access to the user's accounts, e.g., debit or credit accounts, for a limited period of time.

Example #11

Portable Memory

A personal information device 120 may be loaded with digital information, such as music, movies, and other information, including homework and computer files, including, Word, PDF, Excel files, etc. Electronic devices may be utilized to view and play information stored on the personal information device 120. The personal information device 120 may have play lists.

Example #12

Medical Information

Another feature is medical information that a user can have uploaded onto his personal information device 120. If a user gets in a wreck and the ambulance shows up and the user is unconscious, then the medical personnel can plug in the personal information device 120 to find out the user's medical history, so they know how to treat the user. If the user is allergic to something they now know, if the user has some type of disease they now know so they can help the user.

The personal information device 120 may also pull up the user's doctor and insurance so they know where to try and take the user. The user can also use the personal information device 120 when he goes to the hospital or emergency room.

The personal information device 120 will pull up all the user's information so the user does not have to worry about any paper work. The personal information device 120 will also have insurance information and emergency contact information.

The personal information device 120 can also have the user's medical history so that the doctor can know what is going on. The user can also have prescriptions uploaded onto the device 120 then take it to a pharmacy and it will upload the prescription, and insurance etc. The personal information device 120 will keep track of prescription use and make it so only doctors can give out prescription and keep records of who they give prescriptions to. The personal information device 120 may also prevent insurance fraud by accurately identifying the card holder to a medical provider. The personal information device 120 may also prevent the use of fake prescriptions.

Example #13

Driver's License

The device 120 will also act as a driver's license. For instance if a user needs to prove age, the personal information device 120 can plug into an access device 107 that has software that will pull up the user's driver's license, age and photo. If a user gets pulled over, the user just plugs in the personal information device 120 to the police's access device 107 which has software that will only pull up certain info like driver's license, driving record, vehicle registration, and insurance. The policeman will be able to view all this and will be able to know that it is the user because the user had to verify himself through biometrics. Any citation may be uploaded onto the personal information device 120. The user can print the citation at home.

Example #14

Identify Verification

Access devices 107 may be utilized to identify individuals with personal information devices 120. For example, if something is purchased online, the personal information device 120 may be presented to confirm the identity of the user. The personal information device 120 may be used a student identification or any other identification.

Example #15

Passport

A personal information device 120 may also be used a passport.

Example #16

Ticket

A personal information device 120 may also be used a ticket for an event or travel, or as a boarding pass. The ticket information may be loaded onto the personal information device 120. The personal information device 120 may then be presented as a ticket. Use of the personal information device 120 may also allow the creation of an express lane.

Example #17

Caller Identification

Another unique feature about is caller verification. So when someone calls and says they are so and so with this company, a user can ask them to verify themselves and then they will plug their device 120 into a special phone created just for this purpose. It will then send the user the information. It will say who they are. If they work for a company then it will also verify they work for Discover, Visa, Direct TV, etc., that way the user can know who he is talking to. A company can verify customers' information when they plug their device 120 in and verify who they are it will then show the company who they are and their account information. Transactions can also be conducted over the phone through use of the personal information device 120. The personal information device 120 will prevent identity theft over the phone. The personal information device 120 may also be available with a mobile phone.

Example #18

Business Card

The personal information device 120 may also be used to pass information that forms an electronic business card. The information may be passed between two devices 120.

Example #19

Online Account Access

When plugged into a computing device, the personal information device 120 may pull up online sites such as Facebook, emails, gamer tags, etc. The personal information device 120 may automatically log a user into online sites.

Example #20

Multiple Person Identification

A user may register his family's biometric templates on the personal information device 120. This way, a user can verify to authorities his wife, children, or others. The system may be used to register a newborn so when the newborn leaves the hospital, the personal information device 120 may ensure that the right parents are taking home the right baby. Children may also be registered so that it is possible to identify parent and their offspring. The personal information device 120 may also be helpful to authorities.

Example #21

ATM, Credit Card, Debit Card

The personal information device 120 may be used as an ATM card, credit card or a debit card. The personal information device 120 may also be used to apply for ATM or credit or debit cards.

Example #22

Portable Data Storage

The personal information device 120 may interact with other devices, such as a phone, to provide music, images, phone books, etc. Tax or other information may be stored on the personal information device 120.

Example #23

Additional Uses

In an embodiment of the present disclosure, a new computer network may be deployed to do transactions, of any kind, safely and securely. For example, transactions which are involved within the Medicare, Medicaid, various tax transactions and government payments such as those involved with the Social Security system, can all benefit from the present invention. Also, electronic commerce can greatly benefit from use of the present invention. One way to make this possible is by the personal information device 120 itself. Each personal information device 120 will have some type of identification number such as smart card no. 123456XYZ. The personal information device 120 will have the owners information registered to it such as a credit card, debit card, social security number etc. For example, when the owner goes to use his credit card, he will insert the personal information device 120 into a reader and then give his biometric sample. The biometric sample, credit card number, and the personal information card number are all transmitted to the centralized system 100 which will cross check the info and if all the information does not add up then permission is declined. In this manner, the device 120 will have its own unique identification number and nobody else will be able to use the credit card, debit card, social security number, etc., without the personal information device 120 and the personal information device 120 can only be accessed with a biometric sample, thus eliminating the possibility of ID fraud/theft.

Also if the personal information device 120 is stolen or lost, all the user has to do is cancel the personal information device 120 with the centralized system 100 and get a new device 120 that is registered to all of the information. That is, the information in the memory 214 may also be stored in the database 104 at the centralized system 100. A user will no longer will have to cancel all of his or her credit or debit card accounts and won't have to worry about monitoring them because they will only work with the new smart device 120.

No transaction will be able to take place without a personal information device 120 thus making it a safe network to do transactions. So, if somebody somehow is able to hack the old personal information device 120, by ways which are not known and thought to be impossible at this time, it should not matter because the old personal information device 120 will have been canceled at the centralized system 100 so it is useless to anyone who tries to use it. Also any and all information, such as credit/debit card numbers, social security etc., is useless because the information has now been registered to a new personal information device 120 and can only be accessed through the new personal information device 120 and biometric identification over the secure network. Thus, it will be appreciated that the access devices 107 may confirm the validity of a personal information device 120 with the centralized system 100.

In addition, the access devices 107 may be registered with the centralized system 100. This will provide the assurance that the access devices 107 are registered and that it is only able to obtain certain information. This helps if somebody has an access device 107 that has been hacked. In this scenario, the centralized system 100 will deny access to any information on a personal information device 120.

Example #24

Security Access

Users can also use the personal information devices 120 at work as it will give access to certain computers, and programs on the computers. Employers can also grant and deny access to certain areas. For instance, if a user works for the government then the government can give the user access to certain information and different access to different areas. A personal information device 120 can replace any key and also keep record of when and who uses a personal information device 120 to gain access to whatever. A user can set it up so that a computer will only give access to certain people. So if an employer has work computers, the user can give certain employees access to certain computers, and programs. Employers can also keep track of when employees are using the computer. It also prohibits people from using a computer when an employer does not want them to use a computer.

A user's home computer can be setup as an access device 107 so that each user will gain access to their account plugging in their personal information device 120. Guest accounts for others to use that will keep track of who is using it may also be setup. A user may sign in by simply plugging in the personal information device 120 and providing a biometric sample.

It will be appreciated that the method, structure and apparatus disclosed herein is merely one example of a means for verifying an identity of a user, and it should be appreciated that any structure, apparatus or system for verifying an identity of a user which performs functions the same as, or equivalent to, those disclosed herein are intended to fall within the scope of a means for verifying an identity of a human being, including those structures, apparatus or systems for verifying an identity of a user which are presently known, or which may become available in the future. Anything which functions the same as, or equivalently to, a means for verifying an identity of a user falls within the scope of this element.

Those having ordinary skill in the relevant art will appreciate the advantages provide by the features of the present disclosure. For example, it is a feature of the present invention to verify an identity of a user. It is another feature of the present invention to provide a secure transaction and data exchange between two devices using biometric recognition techniques.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for use in securely transferring data in an electronic environment, said system comprising:
   a personal information device, said personal information device comprising a processor and a memory accessible to the processor, the memory having personal data and a biometric template stored therein, the personal information device having an input/output port for transferring data;
   a centralized system having a server connected to a database, the database having stored therein a unique identification number associated with the personal information device and a status of the personal information device;
   an access device having a processor and a memory accessible to the processor, the access device further having an input/output port for communicating with the personal information device;
   a network connection between the centralized system and the access device;
   a biometric sensor;
   wherein the memory of the personal information device has operating instructions stored therein to cause the processor of the personal information device to perform the steps of: (i) receive a request from the access device to access data stored in the memory, (ii) provide a unique identification number to access device, (iii) receive a biometric sample from a user, (iv) compare the biometric sample from the user to the biometric template, and (v) upload the requested data to the access device if the biometric sample and biometric template match;
   wherein the memory of the access device has operating instructions stored therein to cause the processor of the access device to perform the steps of: (i) request data from the personal information device, (ii) receive a unique identification number from the personal information device, (iii) transmit the unique identification number to the centralized system, (iv) receive a message from the centralized system regarding the status of the personal information device, and (v) receive the requested data from the personal information device;
   wherein the memory of the centralized system has operating instructions stored therein to cause the processor of the centralized system to perform the steps of: (i) receive a unique identification number associated with a personal information device from an access device, and (ii) transmit a message regarding the status of the personal information device to the access device.

2. The device of claim 1, further comprising a housing for containing the processor and the memory of the personal information device, the housing having a front housing member and a back housing member, the front housing member having a cutout for accommodating a biometric sensor.

3. The device of claim 2, wherein the housing is approximately 0.125 inches thick by 2.125 inches wide by 3.375 inches long.

4. The device of claim 2, wherein the housing is approximately a shape of a credit card.

5. The device of claim 2, further comprising a battery contained within the housing.

6. The device of claim 1 wherein the biometric sensor is one of the following: a fingerprint scanner, a microphone, and an image capturing device.

7. The device of claim 1, wherein the personal data includes one or more of the following: a driver's license number, a social security number, an address, a credit card number, and a bank account number.

8. A method for securely transferring data in an electronic environment, said method comprising:
   providing a personal information device, said personal information device comprising a processor and a memory accessible to the processor, the memory having personal data and a biometric template stored therein, the personal information device having an input/output port for transferring data;
   providing a centralized system having a server connected to a database, the database having stored therein a unique identification number associated with the personal information device and a status of the personal information device;
   providing an access device having a processor and a memory accessible to the processor, the access device further having an input/output port for communicating with the personal information device;
   providing a network connection between the centralized system and the access device; and
   providing a biometric sensor;
   wherein the memory of the personal information device has operating instructions stored therein to cause the processor of the personal information device to perform the steps of: (i) receive a request from the access device to access data stored in the memory, (ii) provide a unique identification number to access device, (iii) receive a biometric sample from a user, (iv) compare the biometric sample from the user to the biometric template, and (v) upload the requested data to the access device if the biometric sample and biometric template match;
   wherein the memory of the access device has operating instructions stored therein to cause the processor of the access device to perform the steps of: (i)request data from the personal information device, (ii) receive a unique identification number from the personal information device, (iii) transmit the unique identification number to the centralized system, (iv) receive a message from the centralized system regarding the status of the personal information device, and (v) receive the requested data from the personal information device;
   wherein the memory of the centralized system has operating instructions stored therein to cause the processor of the centralized system to perform the steps of:
   (i)receive a unique identification number associated with a personal information device from an access device, and (ii) transmit a message regarding the status of the personal information device to the access device.

9. The method of claim 8, further comprising providing a housing for containing the processor and the memory of the personal information device, the housing having a front housing member and a back housing member, the front housing member having a cutout for accommodating a biometric sensor.

10. The method of claim 9, wherein the housing is approximately 0.125 inches thick by 2.125 inches wide by 3.375 inches long.

11. The method of claim 9, wherein the housing is approximately a shape of a credit card.

12. The method of claim 9, further comprising a battery contained within the housing.

13. The method of claim 8, wherein the biometric sensor is one of the following: a fingerprint scanner, a microphone, and an image capturing device.

14. The method of claim 8, wherein the personal data includes one or more of the following: a driver's license number, a social security number, an address, a credit card number, and a bank account number.

* * * * *